United States Patent
Lim et al.

(10) Patent No.: US 8,391,822 B2
(45) Date of Patent: Mar. 5, 2013

(54) RF RECEIVER AND METHOD TO RECEIVE, AMPLIFY, SAMPLE, DOWN CONVERT, ANTI-ALIASING FILTER, AND ADC CONVERT AN RF SIGNAL

(75) Inventors: Hyung-sun Lim, Hwaseong-si (KR);
Jin-soo Park, Suwon-si (KR);
Heung-bae Lee, Suwon-si (KR);
Young-eil Kim, Suwon-si (KR);
Sang-yoon Jeon, Seoul (KR); Ick-jin Kwon, Hwaseong-si (KR); Bum-man Kim, Pohang-si (KR); Chang-joon Park, Pohang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1274 days.

(21) Appl. No.: 12/169,073

(22) Filed: Jul. 8, 2008

(65) Prior Publication Data
US 2009/0215421 A1     Aug. 27, 2009

(30) Foreign Application Priority Data
Feb. 21, 2008   (KR) .................. 10-2008-0015991

(51) Int. Cl.
*H04B 1/16*   (2006.01)
(52) U.S. Cl. ........................................ 455/323
(58) Field of Classification Search ............... 455/296, 455/307, 313, 314, 318, 323, 324
See application file for complete search history.

(56) References Cited

U.S. PATENT DOCUMENTS

| | | | | |
|---|---|---|---|---|
| 5,640,698 | A * | 6/1997 | Shen et al. | 455/323 |
| 6,744,832 | B2 | 6/2004 | Miao | |
| 6,963,732 | B2 * | 11/2005 | Muhammad et al. | 455/131 |
| 7,003,276 | B2 * | 2/2006 | Muhammad et al. | 455/323 |
| 7,623,838 | B2 * | 11/2009 | Staszewski et al. | 455/319 |
| 2006/0166637 | A1 * | 7/2006 | Lore et al. | 455/313 |
| 2010/0093302 | A1 * | 4/2010 | Abe et al. | 455/325 |
| 2010/0105349 | A1 * | 4/2010 | Qian | 455/323 |

FOREIGN PATENT DOCUMENTS

| | | |
|---|---|---|
| JP | 2000-224578 | 8/2000 |
| KR | 10-2003-0031303 | 4/2003 |
| KR | 10-0692300 | 3/2007 |

* cited by examiner

*Primary Examiner* — Blane J Jackson
(74) *Attorney, Agent, or Firm* — NSIP Law (57) ABSTRACT

A radio frequency (RF) receiver and a method of receiving an RF signal are provided. The RF receiver includes a low-noise amplifying unit which amplifies a received signal while restricting out-of-band interference of the received signal, a sampling unit which performs sampling to convert the amplified signal to a discrete time domain signal, a frequency translation unit which down-converts the discrete time domain signal into a frequency band that enables the discrete time domain signal to be converted into a digital signal and restricts interference from a frequency within an aliasing band according to a sampling frequency, an anti-aliasing filtering unit which prevents aliasing from the down-converted signal, a clock unit which provides the sampling unit, the frequency translation unit, and the anti-aliasing filtering unit with sampling frequencies, and an analog-digital-converter which converts the converted signal into the digital signal.

11 Claims, 8 Drawing Sheets

RF RECEIVER AND METHOD TO RECEIVE, AMPLIFY, SAMPLE, DOWN CONVERT, ANTI-ALIASING FILTER, AND ADC CONVERT AN RF SIGNAL

CROSS REFERENCE TO RELATED APPLICATIONS

This application claims the benefit under 35 U.S.C. §119 (a) of a Korean Patent Application No. 10-2008-0015991, filed on Feb. 21, 2008, the disclosure of which is incorporated herein in its entirety by reference.

TECHNICAL FIELD

The following description relates to a radio frequency (RF) receiver, and more particularly, to an RF receiver and a method of receiving an RF signal.

BACKGROUND

Generally, in a receiving system, a SAW filter is used to eliminate interference that causes in-band noise and is produced by aliasing and system saturation by the use of an out-of-band high-level signal.

An exemplary SAW filter is a surface acoustic wave filter. It is also referred to as a communication filter that uses physical vibration of a piezoelectric substrate. The SAW may filter act as a band-pass filter that allows only the frequencies that are the same as the physical frequencies of the SAW filter to pass through. Such a SAW filter may have even narrower bandwidth for signals to pass through, compared to typical filters using the general LC resonance principle. Hence, the SAW filter may be used to precisely pick up a desired signal within a narrow bandwidth by filtering signals of unnecessary frequencies.

However, typical SAW filter is physically configured and thus there is a limit in reducing its size. In addition, while a receiver may be desired to be integrated with the SAW filter into a single chip, the SAW filter may not be mounted on the same chip. Instead, it is normally placed outside of the receipt chip. Moreover, the SAW filter is relatively expensive, thus increasing the manufacturing cost of the receiver. Therefore, while a SAW filter may be desired for a mobile communication terminal, one may be faced with increased cost of the resulting receiver and difficulty of implementing a one-chip receiver.

SUMMARY

According to an aspect, there is provided a radio frequency receiver which reduces manufacturing cost by removing a SAW filter and enabling implementation of a one-chip receiver.

According to another aspect, a radio frequency (RF) receiver comprises a low-noise amplifying unit which amplifies a received signal while restricting out-of-band interference of the received signal, a sampling unit which performs sampling to convert the amplified signal to a discrete time domain signal, a frequency translation unit which down-converts the discrete time domain signal into a frequency band that enables the discrete time domain signal to be converted into a digital signal and restricts interference from a frequency within an aliasing band according to a sampling frequency, an anti-aliasing filtering unit which prevents aliasing from the down-converted signal, a clock unit which provides the sampling unit, the frequency translation unit, and the anti-aliasing filtering unit with sampling frequencies, and an analog-digital-converter which converts the converted signal into the digital signal.

The low-noise amplifying unit may attenuate the out-of-band interference to approach near-band interference.

The frequency translation unit may down-sample the discrete time domain (sampled) signals sequentially by using at least one of the sampling frequencies.

The frequency translation unit may be formed of one or more switched-capacitor-finite impulse response (SC-FIR) filters.

The frequency translation unit may filter an aliasing band signal from among received signals to satisfy a predetermined signal-to-noise ratio (SNR) level of the RF receiver, and filter a non-aliasing band signal to the extent a predetermined saturation level of the RF receiver is not exceeded.

The frequency translation unit may down-convert a signal of 2.4 GHz to a signal of 10 MHz.

The anti-aliasing filtering unit may filter an in-band interference signal from among signals received from the frequency translation unit to the extent that a predetermined saturation level of the RF receiver is not exceeded.

According to still another aspect, an RF receiving method comprises amplifying a received signal while restricting an out-of-band interference, sampling the amplified signal to convert the amplified signal to a discrete time domain signal, down-converting the discrete time domain signal to a signal of a frequency band which enables the signal to be converted to a digital signal and restricting interference from a frequency within an aliasing band according to a sampling frequency, preventing aliasing from the down-converted signal, and converting the down-converted signal to the digital signal.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness. It is understood that the terminology used herein may be different in other applications or when described by another one skilled in the art.

Figure 1:
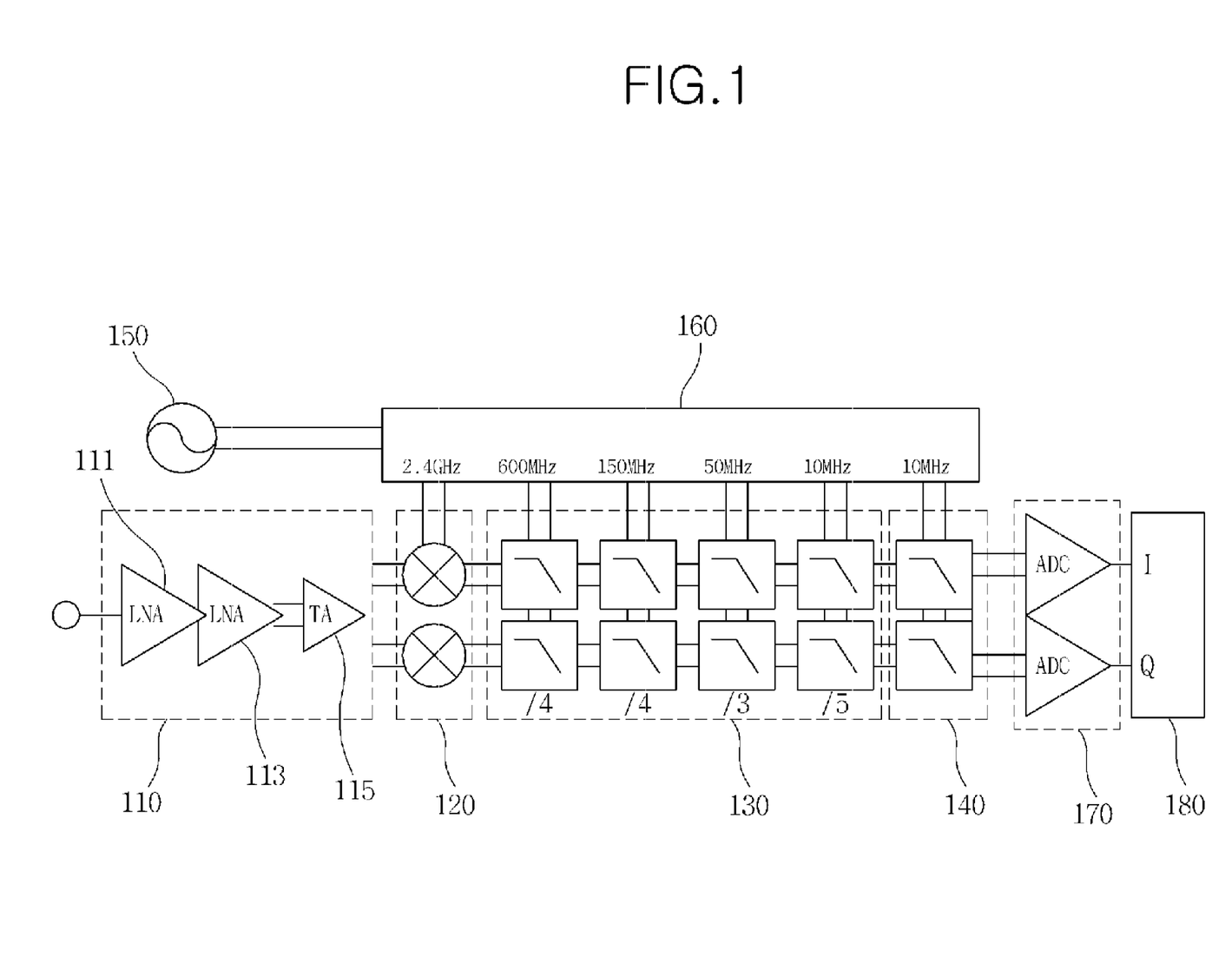
FIG. 1 is a diagram of a radio frequency receiver according to an exemplary embodiment.

FIG. 1 shows a radio frequency receiver according to an exemplary embodiment.

The RF receiver comprises a low-noise amplifying unit 110, a sampling unit 120, a frequency translation unit 130, an anti-aliasing filtering unit 140, an oscillating unit 150, a clock unit 160, an analog digital converter 170, and a digital block 180. As an illustration, frequencies shown in FIG. 1 are sampling frequencies applied where a Bluetooth signal is received, and it is understood that different sampling frequencies may be used for a different application.

The low-noise amplifying unit 110 restricts noise of a received signal, and amplifies the received signal. The low-noise amplifying unit 110 comprises low-noise amplifiers (LNAs) 111 and 113, and a transconductance amplifier (TA) 115. According to an exemplary embodiment, the low-noise amplifiers (LNAs) 111 and 113 of the low-noise amplifying unit 110 amplify a received signal while restricting interference of out-of-band of the received signal.

Generally, the interference is categorized into out-of-band interference and near-band interference. Since a near-band signal is close to a wanted signal, the near-band signal is not attenuated according to an exemplary embodiment. The LNAs 111 and 113 may attenuate the out-of-band interference of a received signal to be close to the near-band interference. Although the low-noise amplifying unit 110 is shown with two low-noise amplifiers 111 and 113 in FIG. 1, this is only an example, and the number of low-noise amplifiers may be varied while still amplifying a received signal and restricting the out-of-band interference to the level of the near-band interference.

Figure 2A:
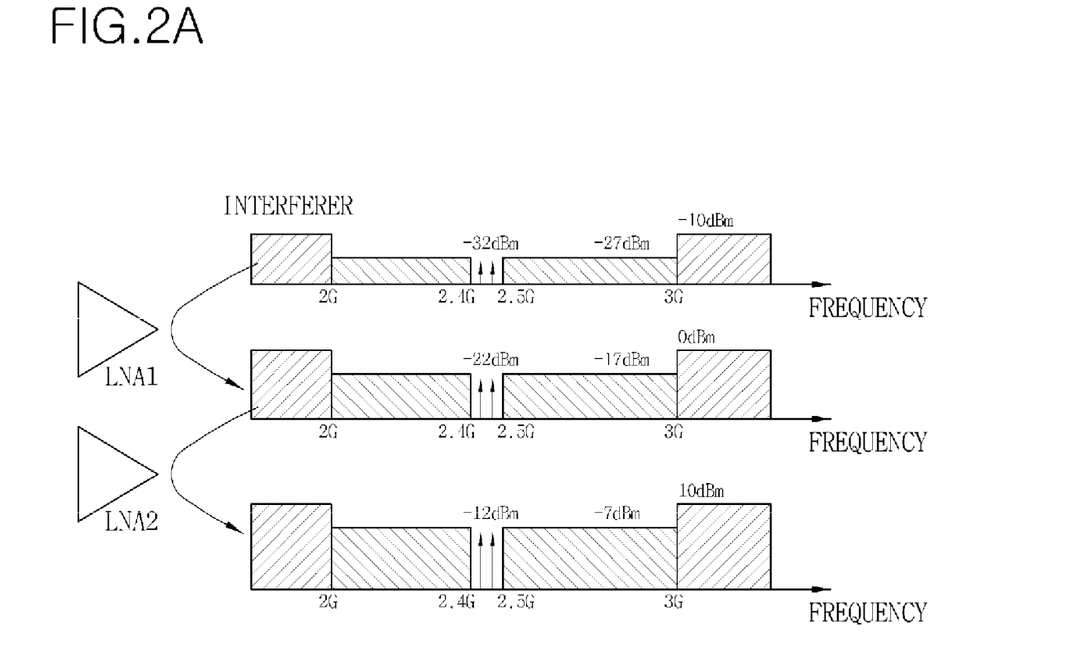
FIGS. 2A and 2B are diagrams illustrating frequency response characteristics of a low-noise amplifier according to an exemplary embodiment.
Figure 2B:
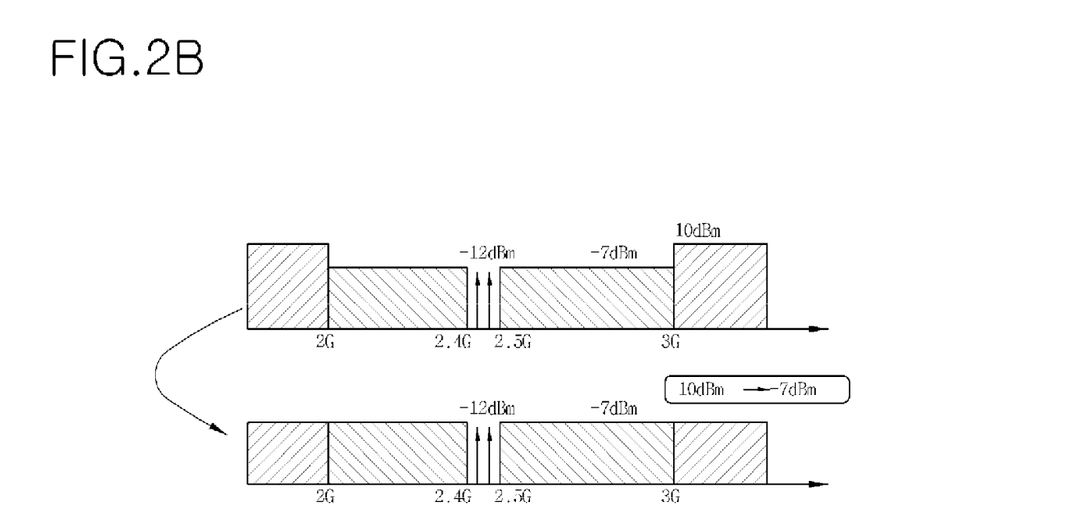

The TA 115 converts an input voltage into an output current. The TA 115 is an additional element for the sampling unit 120 that operates in a current-mode. The operation of the low-noise amplifiers 111 and 113 of the low-noise amplifying unit 110 will be further described later with reference to FIG. 2.

The sampling unit 120 performs sampling to convert the amplified received signal into a discrete time domain. The sampling unit 120 may be formed of an IQ sampler which divides the sampled (discrete time domain) signal into in-phase components and quadrature-phase components.

In FIG. 1, the sampling unit 120 samples a signal to 2.4 GHz in order to apply the sampled signal to a Bluetooth system in which information is contained in the frequency band around 2.4 GHz. Therefore, the sampling frequency of the sampling unit 120 is changed where the sampling unit 120 processes a signal that has information contained in a different frequency band. For example, in a $3^{rd}$ generation wireless code division multiple access (3G WCDMA) system, since desired information is contained at a frequency of 2.14 GHz, the sampling unit 120 performs sampling using a sampling frequency of 2.14 GHz.

The frequency translation unit 130 down-converts the sampled signal into a signal within a predetermined band that may be converted into a digital signal by the analog digital converter 170. The frequency translation unit 130 may perform down-sampling sequentially on signals sampled by the sampling unit using at least one of the sampling frequencies as shown in FIG. 1. In FIG. 1, the numbers, /4, /4, /3, and /5, denote down-sampling ratios.

The frequency translation unit 130 may down-convert a signal of 2.4 GHz into a signal of 10 MHz in order to receive a Bluetooth signal, as shown in FIG. 1. However, the sampling frequency may be changed to process signals of different frequency bands.

To this end, according to an exemplary embodiment, the frequency translation unit 130 may be formed of a finite impulse response (FIR) filter (hereinafter, referred to as "SC-FIR filter") configured with switched capacitors (SCs). The frequency translation unit 130 illustrated in FIG. 1 comprises SC-FIR filters, each of which down-samples signals at a ratio of /4, /4, /3, and /5.

Each of the FIR filters has an input clock and an output clock which are different from each other, which relates to a down-sampling feature. In FIG. 1, the first SC-FIR filter has an input of 2.4 GHz and an output of 600 MHz, the second SC-FIR filter has an input of 600 MHz and an output of 150 MHz, the third SC-FIR filter has an input of 150 MHz and an output of 50 MHz, and the last SC-FIR filter has an input of 50 MHz and an output of 10 MHz.

Furthermore, according to an exemplary embodiment, the frequency translation unit 130 not only converts the frequency of a received signal but also restricts interference with respect to an aliasing band of the received signal according to a sampling frequency.

According to an exemplary embodiment, the frequency translation unit 130 performs filtering on the aliasing band in a manner to satisfy a signal-to-noise ratio (SNR) level required by a system, and performs filtering on a non-aliasing band in a manner not to exceed a saturation level of a receiver. Here, the aliasing band represents a band that affects a wanted signal band in the course of frequency translation while the non-aliasing band represents a band that does not affect a wanted signal band in the course of frequency translation. The required SNR level indicates a requirement that defines the ratio of a signal available to be restored to noise, and the SNR required by a receiver varies according to communication applications such as Bluetooth, WiMax, WCDMA, and so on.

Since a wanted signal is within an aliasing band, the wanted signal needs to be preserved in a manner that can be restored. In other words, interference or noise existing in the aliasing band should not exceed a certain level that makes it difficult to identify the wanted signal. Thus, the aliasing band needs to satisfy the required SNR level, and the non-aliasing band only needs to be maintained to the extent that system saturation does not occur, which may produce a non-linear component, since the wanted signal does not exist in the non-aliasing band.

Since the SC-FIR filter characteristically has a high attenuation pole in a sampling frequency and a frequency band corresponding to a harmonic frequency of the sampling frequency, that is, an aliasing band, the in-band noise generated by in-band aliasing may be eliminated. Referring to FIG. 1, each SC-FIR filter may be required to satisfy requirements for an aliasing band signal and for a non-aliasing band signal according to each sampling frequency.

The anti-aliasing filtering unit 140 eliminates aliasing from the converted signal. According to an exemplary embodiment, the anti-aliasing filtering unit 140 filters in-band interference signals from among the signals received from the frequency translation unit 130 to the extent that the system is not saturated. The anti-aliasing filtering unit 140 may be configured with a various forms of filters, for example, channel selection filters.

The oscillating unit 150 provides the clock unit 160 with frequencies for generating clocks. The clock unit 160 provides the sampling unit 120, the frequency translation unit 130, and the anti-aliasing filtering unit 140 with the sampling frequencies.

The analog-digital converter (ADC) 170 converts the signal converted by the frequency translation unit 130 into a digital signal and provides it to the digital block 180. Although, in FIG. 1, the ADC 170 converts a 10 MHz converted signal into a digital signal, it is understood that the ADC 170 may be designed to process signals of different frequencies.

The digital block 180 processes the converted digital signal to obtain desired information. The digital block 180 may receive and process signals of I-component and Q-component.

FIGS. 2A and 2B show frequency response characteristics of a low-noise amplifier according to an exemplary embodiment.

In FIGS. 2A and 2B, where a received signal is a Bluetooth signal and a frequency band to which a wanted signal belongs, that is, an in-band ranges from 2.4 GHz to 2.5 GHz, the interference is shown. Here, a near-band ranges from 2 GHz to 3 GHz excluding the in-band range, and a frequency range excluding the range of 2 GHz to 3 GHz is an out-of-band range.

Specifically, FIG. 2A illustrates a problem that may occur when low-noise amplifiers having only an amplifying function are used. The out-of-band interference in FIG. 2A generally affects a receiving system more than a wanted signal does.

In FIG. 2A, LNA1 and LNA2 are low-noise amplifiers each of which has a gain of 10 dBm. As shown in FIG. 2A, where the received signal is simply amplified by the LNAs, a power level of the out-of-band interference increases to 10 dBm. However, the power level of 10 dBm exceeds the normal power level that enables the wanted signal to be amplified by a normal LNA without distortion. Therefore, interference of 3 GHz or more or of 2 GHz or less, that is, the out-of-band interference of 10 dBm should be reduced.

FIG. 2B shows the operation of the low-noise amplifiers 111 and 113 in FIG. 1. The low-noise amplifiers 111 and 113 does not simply amplify a received signal but restricts, for example, interference of 3 GHz or more or of 2 GHz or less so as to prevent a power level from exceeding a predetermined level that enables the wanted signal to be amplified.

As shown in FIG. 2B, according to an exemplary embodiment, it may be noted that the dBm interference of 3 GHz or more or of 2 GHz or less decreases to −7 dBm. That is, an out-of-band signal is attenuated to a level of near-band interference. Hence, the low-noise amplifiers 111 and 113 attenuate the out-of-band signals to a level of the near-band interference, so that the out-of-band interference may be appropriately restricted without a SAW filter.

Figure 3:
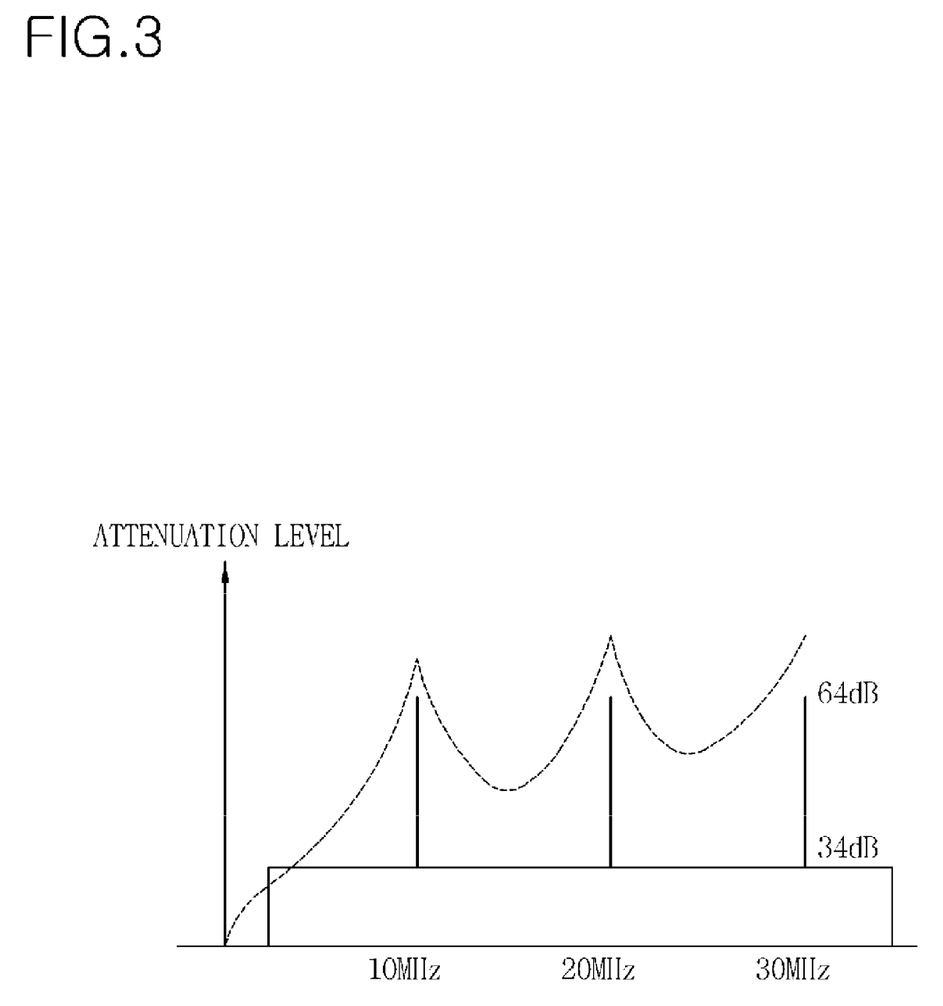
FIG. 3 is a graph illustrating filter requirements of a frequency translation unit 130 of a system of FIG. 1 according to an exemplary embodiment.

FIG. 3 illustrates filter requirements of a frequency translation unit 130 of a system according to an exemplary embodiment.

That is, FIG. 3 shows filter requirements that the frequency translation unit 130 should meet according to an exemplary embodiment. The frequency translation unit 130 performs frequency translation on signals.

In a Bluetooth system, the wanted signal may exist between DC and 1 MHz. It is understood that a band in which the wanted signal exists varies according to a different application. With reference to FIG. 1, where a received signal is sampled to a frequency of 2.4 GHz, in a frequency band between 2.4 GHz and 2.401 GHz, the wanted signal may exists as well as in a frequency band between DC and 1 MHz. Next, where the received signal is sampled to a frequency of 600 MHz, the wanted signal may exist in the frequency band between 600 MHz and 601 MHz, between 1.2 GHz and 1.201 GHz, and 1.8 GHz and 1.801 GHz. In other words, the frequencies of the signals located within such frequency bands are translated to a band in which the wanted signal exists. Where 10 MHz sampling is performed on the received signal in the final step of the frequency translation unit 130, a part of 10 MHz harmonic frequency may become a wanted signal.

However, most signals that fall within the wanted signal band after the frequency translation is performed thereon by sampling may not be the wanted signals but noise. Also, it should be noted that the wanted signals are only within 2.4 GHz to 2.401 GHz, and are between DC to 1 MHz in the sampling unit 120.

According to an exemplary embodiment, where the translated frequency signal is within the same frequency band as the wanted signals, the frequency translation unit 130 conducts filtering in a manner that satisfies SNR requirements in a receiving system, or where the translated frequency signal is within a different frequency band from the wanted signals, the frequency translation unit 130 conducts filtering in a manner that the receiving system is not saturated.

Where the ADC 170 of the receiver in FIG. 1 receives the signal on which 10 MHz sampling is performed, according to an exemplary embodiment, the filters of the frequency translation unit 130 may satisfy an attenuation level of 64 dB on the basis of a frequency of 10 Hz, and satisfy an attenuation level of 34 dB for the other frequency range.

FIG. 3 shows a frequency response obtained where the signal is sampled to 10 MHz by passing through all filters included in the frequency translation unit 130. Since 10 MHz sampling is performed, signals of frequencies corresponding to the harmonic frequencies may fall within an in-band, and thus attenuation levels at the frequency corresponding to the harmonic frequencies, that is, frequencies of 10 MHz, 20 MHz, and 30 MHz, should be high.

The filter requirements of an aliasing band may be determined by the following condition based on an SNR. Here, numbers in the equation are examples for calculation.

Signal SNR=signal level−(interference level−attenuation level)−margin

Attenuation level=interference level−signal level+margin+signal SNR=−27 dBm−(−70 dBm)+6 dB+15 dB=64 dB          Equation 1

The filter requirements of the non-aliasing band may be determined by the following condition based on the system saturation.

ADC full scale=(interference level−attenuation level)+maximum gain+margin

That is, attenuation level=interference level+maximum gain+margin−ADC full scale=−27 dBm+55 dB+6 dB−0 dBm=34 dB          Equation 2

In the Equation 2, the ADC full scale indicates the maximum voltage swing level at which the ADC operates.

Figure 4A:
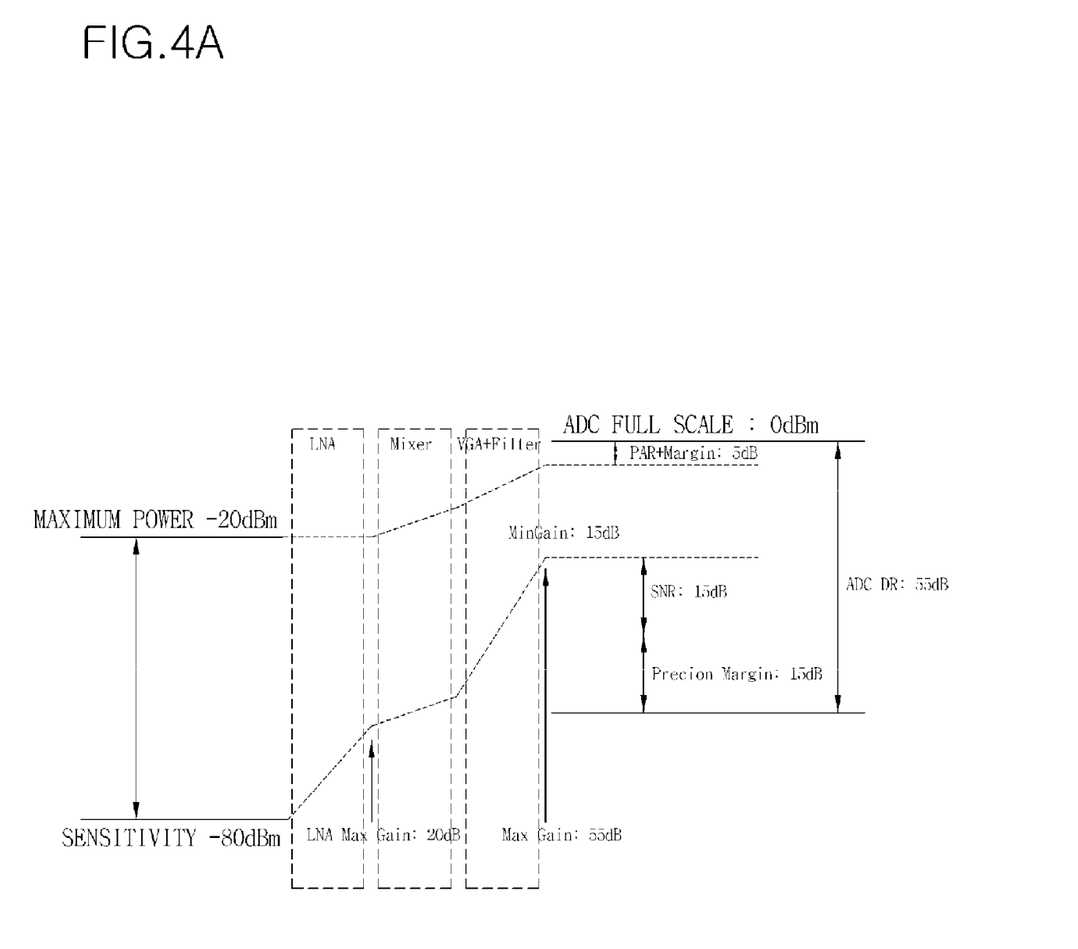
FIGS. 4A and 4B are an illustration and a graph, respectively, showing a gain plan and an ADC dynamic range of a system according to an exemplary embodiment.
Figure 4B:
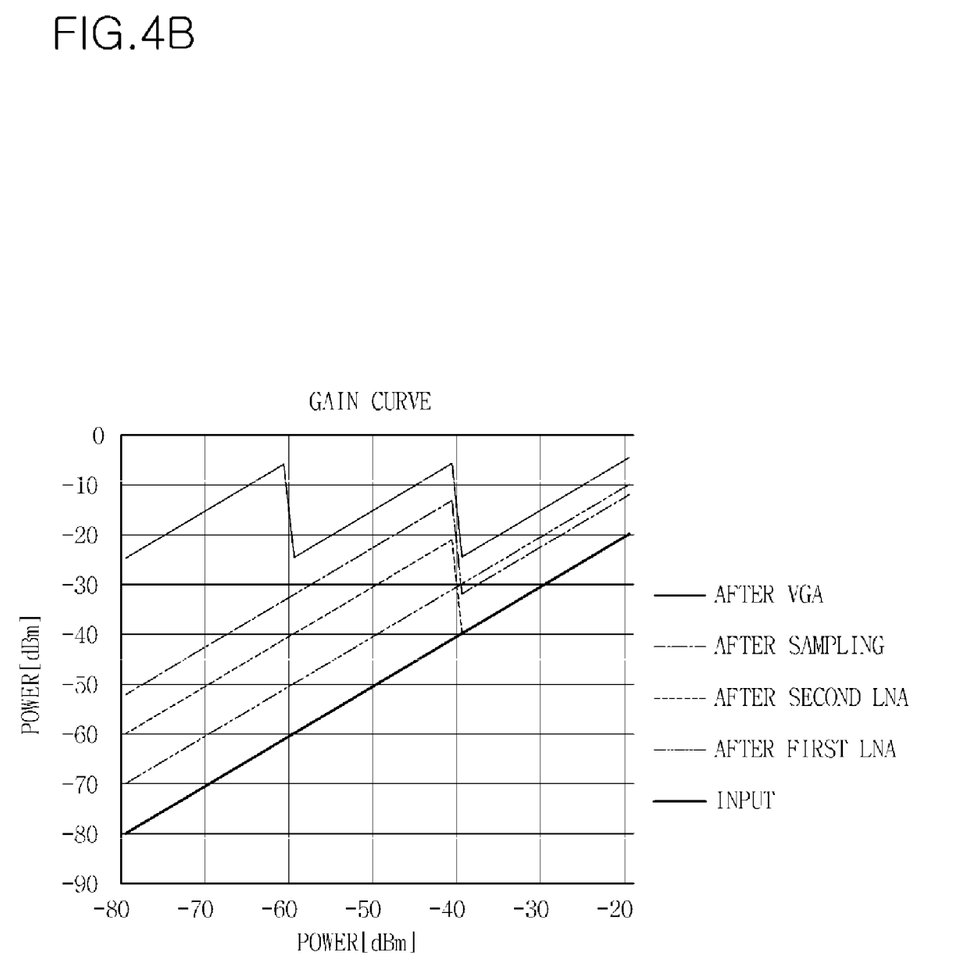

FIGS. 4A and 4B show a gain plan and an ADC dynamic range of a system according to an exemplary embodiment.

FIG. 4A shows a gain of each element forming the system, and FIG. 4B shows an output power level of a receiving system which varies according to an input power level.

As shown in FIG. 4A, it is assumed that a signal having a power between −80 dBm to −20 dBm is input to the receiving system. According to the power level, an amplifying unit, that is, an LNA block has a gain of 20 dB or a gain of 0 dBm. To prevent the system from being saturated with a high power gain, a gain may be adjusted so that an LNA having a gain of 20 dB may produce an output of −60 dBm from an input of −80 dBm, which is the lowest power level.

In FIG. 4A, with reference to FIG. 1, a sampling unit 120 which is denoted as a mixer has a gain of 8 dB, and a frequency translation unit 130 has a gain of 7 dB or of 27 dB. For reference, in FIG. 4A, a variable gain amplifier (VGA) is a block that produces a gain in the frequency translation unit 130 which originally does not have a gain.

Thus, the input signal ranging between −80 dBm to −20 dBm becomes a signal ranging between −25 dBm to −5 dBm at an output end.

Figure 5A:
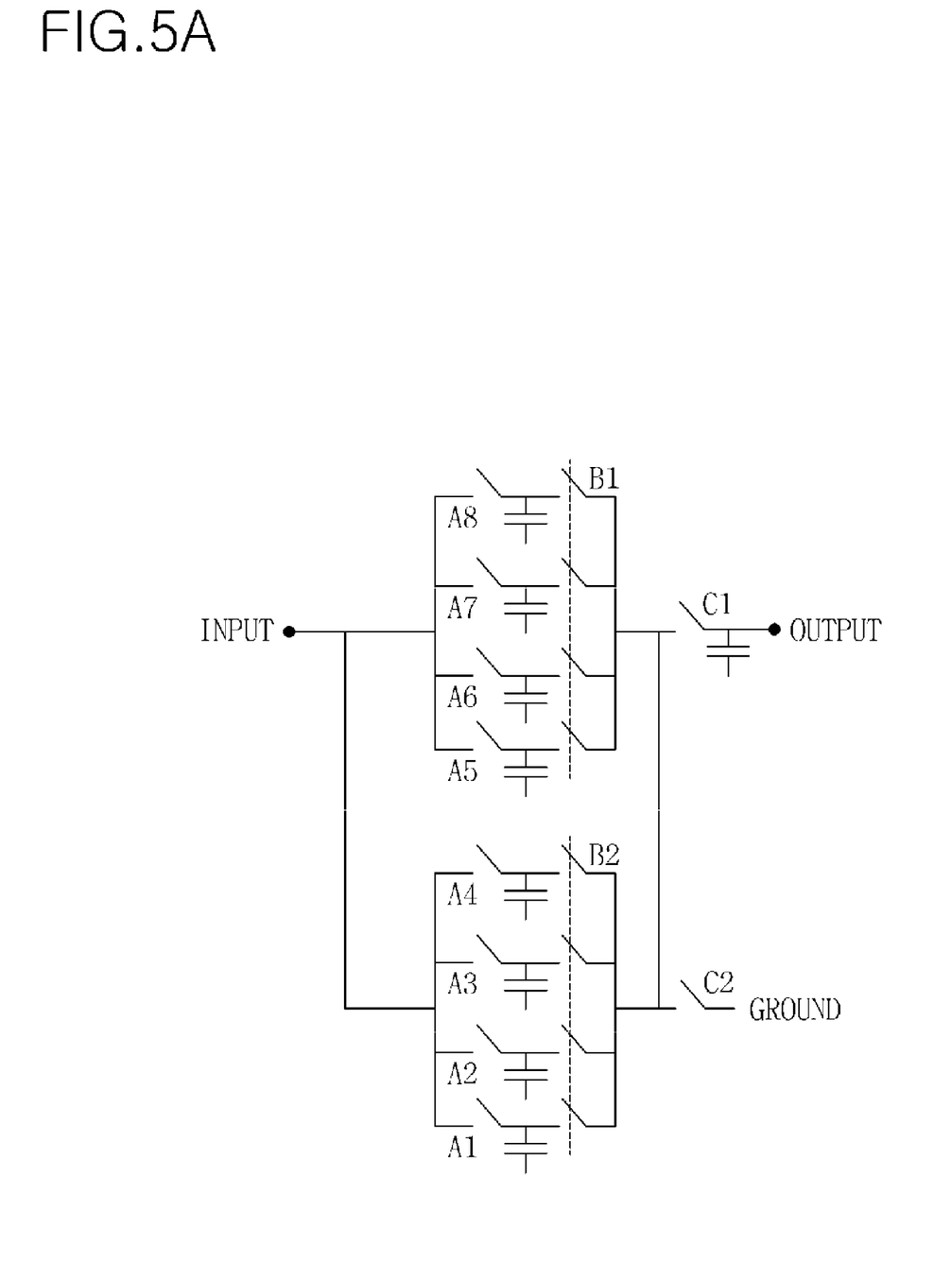
FIGS. 5A and 5B are illustrations for explaining simple structures of SC-FIR filters included in a frequency translation unit and a frequency response thereof according to an exemplary embodiment.
Figure 5B:
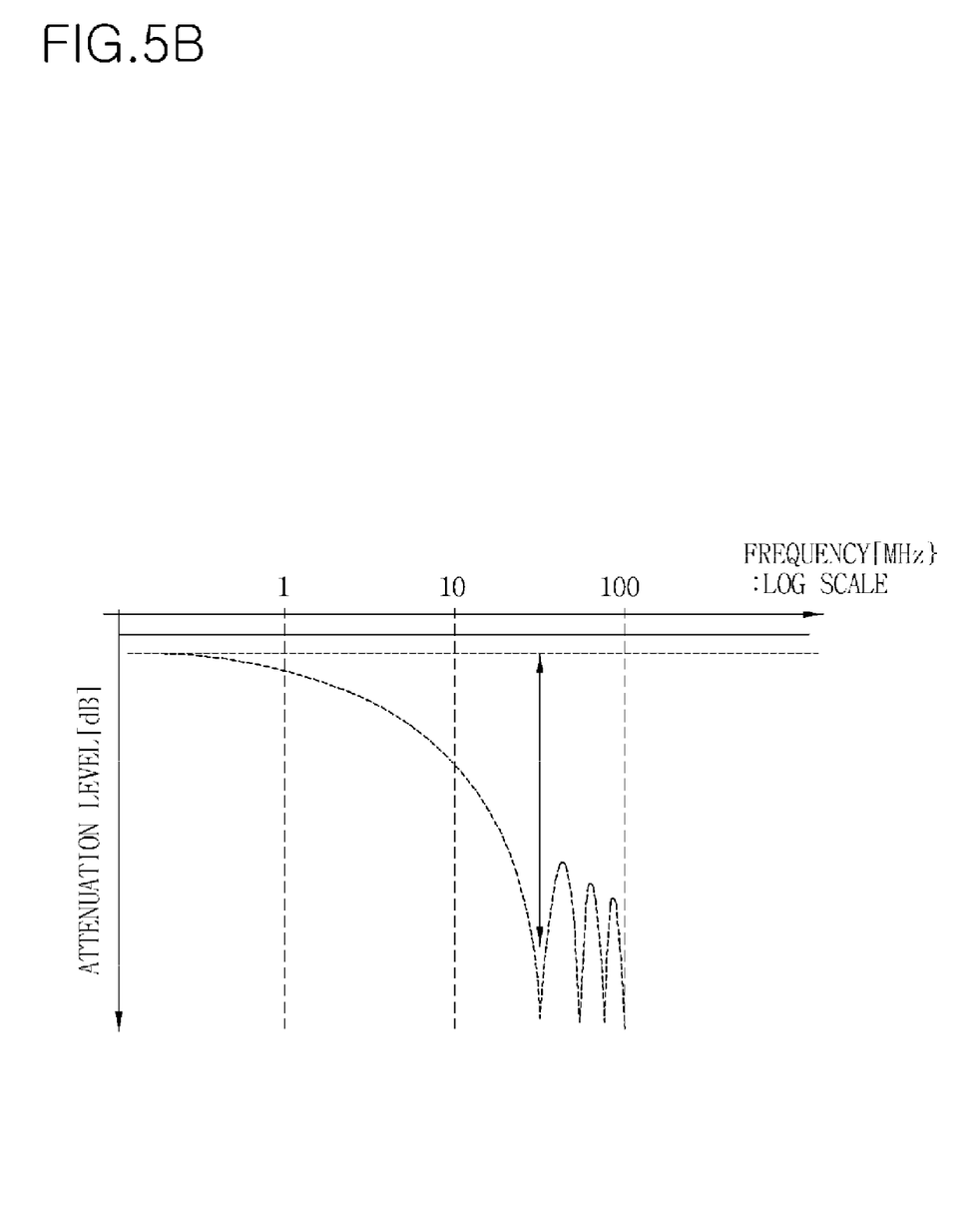

FIGS. 5A and 5B illustrate exemplary structures of SC-FIR filters included in a frequency translation unit and a frequency response thereof according to an exemplary embodiment.

FIG. 5A shows a simple structure of the SC-FIR filter according to an exemplary embodiment. More specifically, in FIG. 5A, the structure is simplified from the first SC-FIR filter having a down sampling ratio of /4 in FIG. 1.

Referring to FIG. 5A, switches A1 to A8 operate at a sampling clock of 2.4 GHz, and C1 and C2 operate at a sampling clock of 600 MHz. As such, an input clock and an output clock of each SC-FIR filter are different from each other, and these different input and output clocks are related to down sampling. B1 and B2 denote switches for differentiating data input through A1 to A4 from data input through A5 to A8.

In the structure in FIG. 5A, input sampling data of 2.4 GHz is stored in a capacitor in a corresponding switch where the switches A1 to A8 sequentially open. While the data is stored in each capacitor of the switches A1 to A4, the switch B2 is turned off and the switch B1 is turned on to transmit the data having been accumulated in the switches A5 to A8 to a switch C1. At this time, the data accumulated in the switches A5 to A8 are averaged, which is called moving average.

If the switch B2 is open where the switches A5 to A8 are open, information stored in the switches A1 to A4 are transferred to the switch C1 through the switch B2, and the data is 600 MHz down-sampled to transmit the data to the next filter. At this time, the data stored in the switches A1 to A4 are averaged. With such an averaging procedure, a pole as shown in FIG. 5B is generated, and this pole is used as a filter effect.

Specifically, in the case of /4 filter, where the sampling data of 2.4 GHz is down-sampled to 600 MHz, the poles are generated at frequencies of 600 MHz, 1.2 GHz, 1.8 GHz, and 2.4 GHz. That is, since the data is sampled to 600 MHz at the output end, signals at around 600 MHz, 1.2 GHz, 1.8 GHz, and 2.4 GHz are frequency translated to a domain of the wanted signal, which may be removed by the filter effect.

FIG. 5B shows attenuation of a FIR filter at poles schematically, and since the exact values vary according to the size of a gate of the transistor used for a circuit or a value of a capacitor, they are not displayed in the graph.

Figure 6:
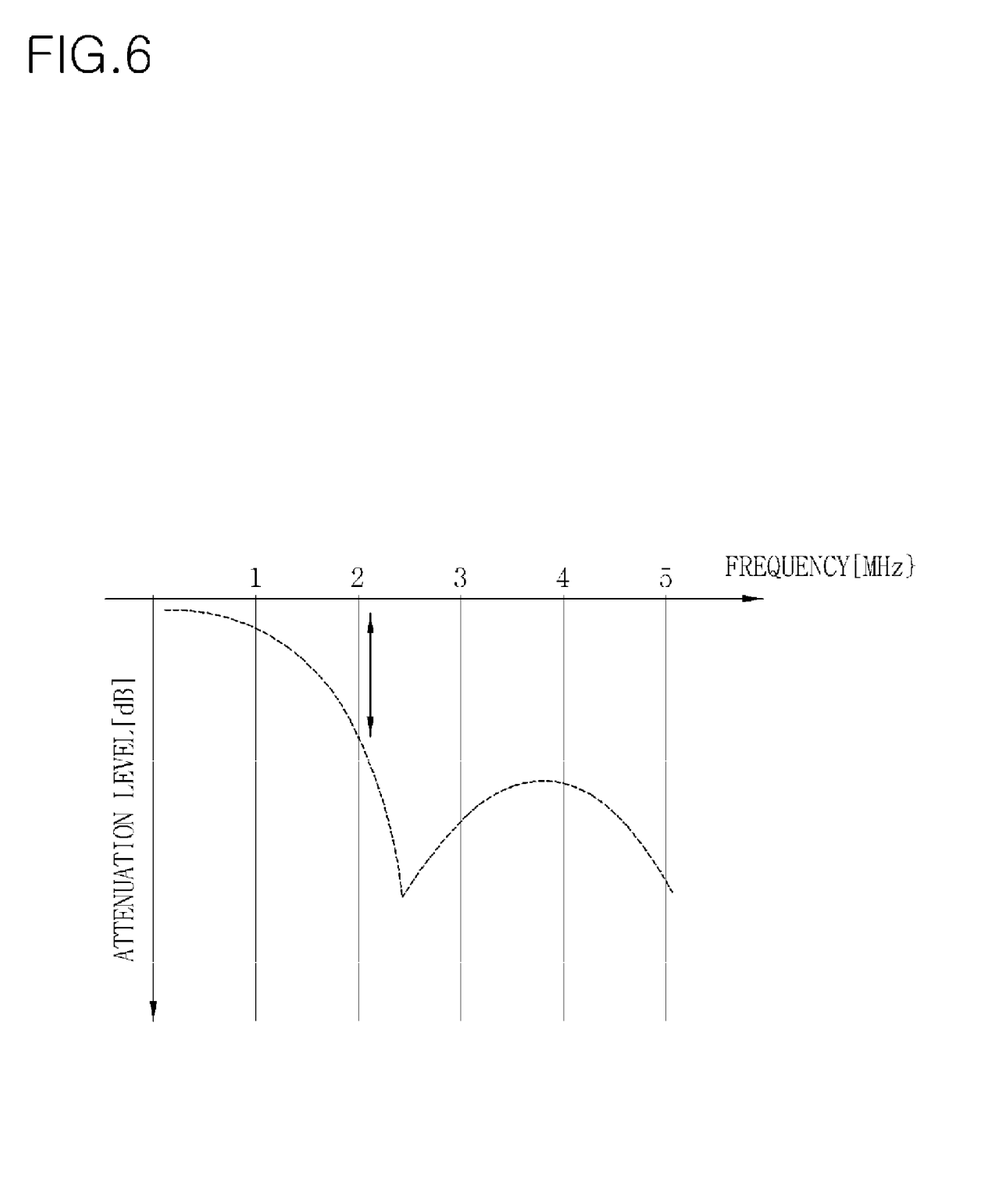
FIG. 6 is a graph illustrating a frequency response of an anti-aliasing filter according to an exemplary embodiment.

FIG. 6 illustrates a frequency response of an anti-aliasing filter according to an exemplary embodiment.

The signals out of 10 MHz sampled by 10 MHz and transmitted to the ADC 170 in the receiver in FIG. 1 are explained with reference to FIGS. 5A and 5B. Signals within 10 MHz are not affected by sampling. Generally, in the common applications, interference within 10 MHz is called in-band interference.

In a Bluetooth system, the in-band interference may have a specification of 3 MHz or more, 2 MHz, and 1 MHz. Where a wanted signal is within DC to 1 MHz, the in-band interference may not affect the wanted signal. Hence, in the case of the in-band interference, the anti-aliasing filter may be configured in a manner that does not saturate a receiving system.

Therefore, the filter requirements in consideration with the in-band interference may be determined by the same condition as the above-described filter requirements of the non-aliasing band.

In other words, the Equation 2, that is, attenuation level=interference level+maximum gain+margin−ADC full scale, may be used to determine the filter requirements.

(1) in the case of 3 MHz or more

Attenuation level=−20 dBM+55 dBm+6 dB−0 dBm=41 dB (2) in the case of 2 MHz

Attenuation level=−30 dBm+55 dB+6 dB−0 dBm=31 dB (3) in the case of 1 MHz

Attenuation level=−60 dBm+55 dB+6 dB−0 dBm=1 dB

According to certain embodiments described above, a system saturation problem caused by a high-level out-of-band signal may be addressed by use of a low-noise amplifier having a high-Q gain performance, and noise produced in an in-band by aliasing may be reduced by FIR filters having high attenuation poles. Therefore, noise may be reduced without a SAW filter and a receiver may receive only a desired signal.

According to certain embodiments above, an RF receiver processes a signal in a discrete time domain, thereby providing a system more close to a software defined radio (SDR) system. Also, the RF receiver is applicable to detect signals of various communication applications by changing a sampling rate.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claim.

What is claimed is:

1. A radio frequency (RF) receiver comprising:
   a low-noise amplifying unit which amplifies a received signal while restricting out-of-band interference of the received signal;
   a sampling unit which performs sampling to convert the amplified signal to a discrete time domain signal;
   a frequency translation unit which down-converts the discrete time domain signal into a frequency band that enables the discrete time domain signal to be converted into a digital signal and restricts interference from a frequency within an aliasing band according to a sampling frequency;
   an anti-aliasing filtering unit which prevents aliasing from the down-converted signal;
   a clock unit which provides the sampling unit, the frequency translation unit, and the anti-aliasing filtering unit with sampling frequencies; and
   an analog-digital-converter which converts the converted signal into the digital signal.

2. The RF receiver of claim 1, wherein the low-noise amplifying unit attenuates the level of out-of-band interference to approach the level of near-band interference.

3. The RF receiver of claim 1, wherein the frequency translation unit down-samples sampled signals sequentially by using at least one of the sampling frequencies.

4. The RF receiver of claim 1, wherein the frequency translation unit is formed of one or more switched-capacitor-finite impulse response (SC-FIR) filters.

5. The RF receiver of claim 1, wherein the frequency translation unit filters an aliasing band signal from among received signals to satisfy a predetermined signal-to-noise ratio (SNR) level of the RF receiver, and filters a non-aliasing band signal to the extent that a predetermined saturation level of the RF receiver is not exceeded.

6. The RF receiver of claim 1, wherein the frequency translation unit down-converts a signal of 2.4 GHz to a signal of 10 MHz.

7. The RF receiver of claim 1, wherein the anti-aliasing filtering unit filters an in-band interference signal from among signals received from the frequency translation unit to the extent that a predetermined saturation level of the RF receiver is not exceeded.

8. A radio frequency (RF) receiving method comprising:
amplifying a received signal while restricting an out-of-band interference;
sampling the amplified signal to convert the amplified signal to a discrete time domain signal;
down-converting the discrete time domain signal to a signal of a frequency band which enables the signal to be converted to a digital signal and restricting interference from a frequency within an aliasing band according to a sampling frequency;
preventing aliasing from the down-converted signal; and
converting the down-converted signal to the digital signal.

9. The RF receiving method of claim 8, wherein the amplifying of the received signal comprises attenuating the level of out-of-band interference of the received signal to approach the level of near-band interference.

10. The RF receiving method of claim 8, wherein the restricting of the interference from the frequency within the aliasing band comprises filtering an aliasing band signal from among received signals to satisfy a predetermined signal-to-noise ratio (SNR) level of the RF receiver and filtering a non-aliasing band signal to the extent that a predetermined saturation level of the RF receiver is not exceeded.

11. A radio frequency (RF) receiver comprising:
a low-noise amplifying unit that amplifies a signal;
a sampling unit which performs sampling to convert the amplified signal to a discrete time domain signal;
a frequency translation unit which down-converts the discrete time domain signal into a signal within a predetermined band capable of being converted into a digital signal;
an anti-aliasing filtering unit which prevents aliasing from the down-converted signal;
a clock unit which provides the sampling unit, the frequency translation unit, and the anti-aliasing filtering unit with sampling frequencies; and
an analog-digital-converter which converts the converted signal into the digital signal.

* * * * *